(12) United States Patent
Hill et al.

(10) Patent No.: US 11,262,897 B2
(45) Date of Patent: Mar. 1, 2022

(54) METHOD AND APPARATUS FOR MANAGING AND ORGANIZING OBJECTS IN A VIRTUAL REPOSITORY

(71) Applicant: Nureva, Inc., Calgary (CA)

(72) Inventors: Doug Hill, Calgary (CA); Mark Andrew Fletcher, Ottawa (CA); Stacey Ellen Black, Stittsville (CA)

(73) Assignee: NUREVA INC., Calgary (CA)

( * ) Notice: Subject to any disclaimer, the term of this patent is extended or adjusted under 35 U.S.C. 154(b) by 0 days.

(21) Appl. No.: 15/580,391

(22) PCT Filed: Jun. 10, 2016

(86) PCT No.: PCT/CA2016/050659
§ 371 (c)(1),
(2) Date: Dec. 7, 2017

(87) PCT Pub. No.: WO2016/197247
PCT Pub. Date: Dec. 15, 2016

(65) Prior Publication Data
US 2018/0173406 A1    Jun. 21, 2018

Related U.S. Application Data

(60) Provisional application No. 62/175,105, filed on Jun. 12, 2015.

(51) Int. Cl.
*G06F 3/00*     (2006.01)
*G06F 3/04845*  (2022.01)
(Continued)

(52) U.S. Cl.
CPC ........ *G06F 3/04845* (2013.01); *G06F 3/0481* (2013.01); *G06F 3/0486* (2013.01);
(Continued)

(58) Field of Classification Search
CPC ............... G06F 3/04845; G06F 3/0481; G06F 3/04842; G06F 3/0486; G06F 3/04883; G06F 16/904; G06F 2203/04804
(Continued)

(56) References Cited

U.S. PATENT DOCUMENTS 5,764,215 A * 6/1998 Brown ................ G06F 3/04842
                                                345/620
6,005,570 A * 12/1999 Gayraud ............. G06F 3/04895
                                                715/709

(Continued)

FOREIGN PATENT DOCUMENTS

EP      2 816 456 A1    12/2014

OTHER PUBLICATIONS

WikiHow, "How to Drag and Drop", online as of Apr. 10, 2004, 4 pages https://web.archive.org/web/20140410222239/https://www.wikihow.com/Drag-and-Drop.*

(Continued)

*Primary Examiner* — Cesar B Paula
*Assistant Examiner* — David Faber
(74) *Attorney, Agent, or Firm* — Katten Muchin Rosenman LLP

(57) ABSTRACT

A method and system for managing and organizing objects in a virtual workspace is disclosed. The method and system display a plurality of objects and containers on the virtual workspace. The objects and containers are assigned to corresponding layers. The method and system receive user input for changing the corresponding layer of one or more of the objects and containers, recursively fit test each of the layers for an overlap between the one or more of the objects and containers and each container assigned to each layer based on the user input, incorporate the one or more objects and containers into a target container assigned to a target (Continued)

layer when the overlap exceeds a predetermined threshold, and assigns the one or more of the objects and containers to a background layer when the overlap fails to exceed the predetermined threshold in the fit testing.

29 Claims, 8 Drawing Sheets

(51) Int. Cl.
| | |
|---|---|
| G06F 16/904 | (2019.01) |
| G06F 3/0481 | (2022.01) |
| G06F 3/04883 | (2022.01) |
| G06F 3/0486 | (2013.01) |
| G06F 3/04842 | (2022.01) |

(52) U.S. Cl.
CPC ...... *G06F 3/04842* (2013.01); *G06F 3/04883* (2013.01); *G06F 16/904* (2019.01); *G06F 2203/04804* (2013.01)

(58) Field of Classification Search
USPC .......................................................... 715/798
See application file for complete search history.

(56) References Cited

U.S. PATENT DOCUMENTS

| | | | | |
|---|---|---|---|---|
| 7,543,278 | B2* | 6/2009 | Klementiev | G06F 3/0482 717/125 |
| 8,611,678 | B2 | 12/2013 | Hansen et al. | |
| 8,677,268 | B2 | 3/2014 | Capela et al. | |
| 9,691,359 | B2* | 6/2017 | Danielsson | G01C 23/00 |
| 2005/0108620 | A1 | 5/2005 | Allyn et al. | |
| 2008/0011819 | A1* | 1/2008 | Patil | G06F 11/3672 235/375 |
| 2008/0225007 | A1 | 9/2008 | Nakadaira et al. | |
| 2008/0307047 | A1* | 12/2008 | Jowett | G06F 8/38 709/203 |
| 2009/0058820 | A1 | 3/2009 | Hinkley | |
| 2010/0107101 | A1* | 4/2010 | Shaw | G06F 3/0481 715/766 |
| 2011/0029904 | A1 | 2/2011 | Smith et al. | |
| 2011/0055299 | A1 | 3/2011 | Phillips | |
| 2012/0246596 | A1* | 9/2012 | Ording | G06F 3/0481 715/799 |
| 2013/0147794 | A1 | 6/2013 | Lee et al. | |
| 2014/0025203 | A1* | 1/2014 | Inazumi | B25J 9/1666 700/255 |
| 2014/0115480 | A1* | 4/2014 | Lundgren | G06F 9/451 715/733 |
| 2014/0164967 | A1 | 6/2014 | Takamura et al. | |
| 2014/0237367 | A1* | 8/2014 | Jung | G06F 3/04845 715/728 |
| 2014/0331187 | A1 | 11/2014 | Hicks et al. | |
| 2015/0149929 | A1 | 5/2015 | Shepherd et al. | |
| 2016/0117080 | A1* | 4/2016 | Hofsetz | G06F 3/0482 715/762 |
| 2016/0124618 | A1* | 5/2016 | Bostick | G06F 3/0481 715/790 |
| 2016/0188303 | A1* | 6/2016 | Rodrigues De Araujo | G06F 3/0416 715/762 |
| 2016/0291828 | A1* | 10/2016 | Rosnow | G06F 3/04842 |

OTHER PUBLICATIONS

Microsoft, "MicrosoftWindows 7", Screenshots (SS) SS0-6, copyrighted 2009, 7 pages.*

Kaelin, Mark; "Microsoft Windows 7 Service Pack 1 released to public", Feb. 22, 2011, TechRepublic, 1 page https://www.techrepublic.com/blog/windows-and-office/microsoft-windows-7-service-pack-1-released-to-public/.*

International Search Report for International Application No. PCT/CA2016/050659 dated Oct. 5, 2016.

Extended European Search Report for European Patent Application No. 16806478.0 dated Jan. 3, 2019, 8 pages.

Communication pursuant to Article 94(3) EPC dated Mar. 16, 2020, from European Patent Application No. 16806478.0, 7 sheets.

* cited by examiner

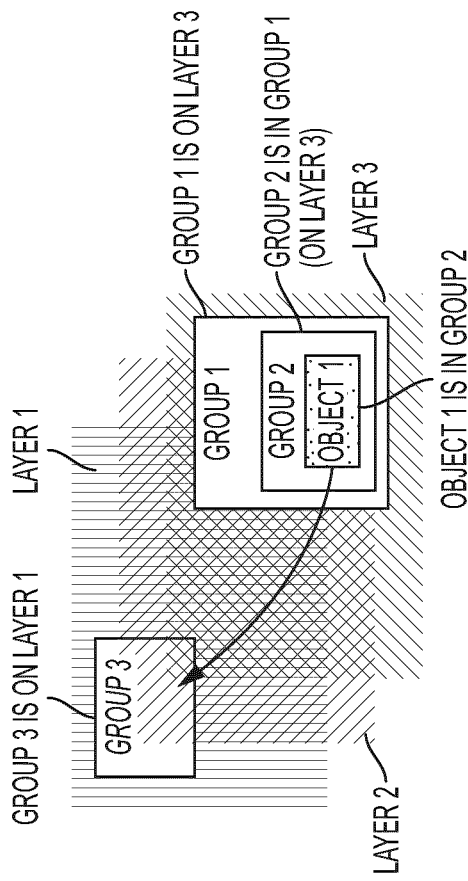
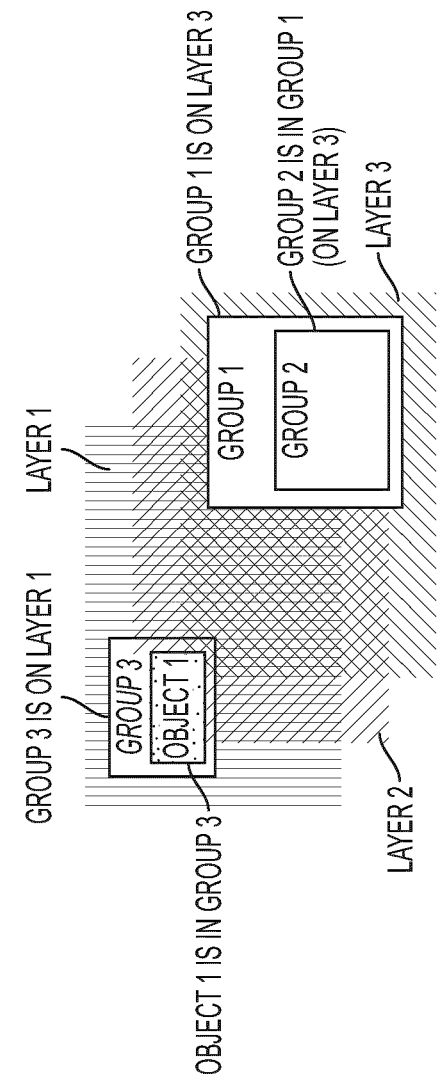
FIG. 4A
FIG. 4B

METHOD AND APPARATUS FOR MANAGING AND ORGANIZING OBJECTS IN A VIRTUAL REPOSITORY

CROSS-REFERENCE TO RELATED APPLICATIONS

This application is based upon and claims the benefit of priority from the prior U.S. Provisional Application No. 62/175,105, filed on Jun. 12, 2015, the entire contents of which are incorporated herein by reference.

BACKGROUND OF THE INVENTION

Field of the Invention

The present invention generally relates to computer systems for managing virtual objects and corresponding user interfaces. And, more specifically, the present invention is directed to systems and methods for presenting virtual objects in an organized manner and for providing a seamless interface to manipulate and reorganize the virtual objects.

Description of Related Art

It is well known in the art to provide executable programs in computer systems. A conventional system is described in U.S. Pat. No. 7,949,180 to Maeda et al. FIG. 1 herein illustrates a computer system storing a program wherein system 10 includes a control part 11, a storage part 12, an operation part 13, a display part 14, and an output part 15. Each program is stored on storage part 12, where the application of the program is output to display part 14 via output part 15.

Applications on conventional systems have been utilized for the management and organization of objects such as images, videos, documents, etc. And these applications have allowed for the management and organization via grouping and ungrouping of objects by treating groups of objects as one object. For example, applications like PowerPoint, Graphics Application, and SMART Notebook allow objects to be grouped together to act like one object. These applications utilize grouping commands (group and ungroup) on a number of selected objects.

U.S. Pat. No. 8,611,678 describes a technique for grouping digital media items based on shared features.

U.S. Pat. No. 8,677,268 describes a technique for resizing a currently selected user interface object that includes simultaneously displaying on a touch-sensitive display the currently selected user interface object having a center, and a plurality of resizing handles for the currently selected user interface object.

US 2005/0108620 describes a technique where multiple objects can be selected and then manipulated with respect to a common reference using a common manipulation operation without the need to perform grouping or ungrouping operations on the objects.

US 2009/0058820 describes a system that facilitates in situ searching of data with an interface that can receive a flick gesture from an input device.

US 2014/0164967 describes an object operation apparatus that allows users to operate one or more objects, wherein when the operation is a predetermined operation in controlling an object in a selected state according to the operation, the object is controlled in the selected state according to the predetermined operation such that a control of the object under a condition that the object is selected by one user differs from a control of the object under a condition that the object is selected by a plurality of users.

US 2014/0331187 describes a technique for providing a group mode in a computing device to group objects (e.g., files, photos, etc.) displayed and/or stored on the computing device into a bundle. The group mode can be invoked in response to a swipe gesture, a press-and-hold gesture, and/or other user input indicative that the group mode is desired.

SUMMARY OF THE INVENTION

According to an aspect of the invention, there is provided a system for allowing users to manage and organize objects on a display. More specifically, it is an object of the invention to provide a large collaborative system to organize and categorize objects on a digital canvas or workspace. The present invention allows for seamless and automated management and organization of objects within an application. Furthermore, the present invention allows mobility of objects using layers for efficiently grouping and ungrouping objects to other layers.

BRIEF DESCRIPTION OF DRAWINGS

FIGS. 4A and 4B illustrate an alternative method to grouping and ungrouping an object by dragging an object into a container according to an exemplary embodiment of the invention.

DETAILED DESCRIPTION OF THE PRESENTLY PREFERRED EXEMPLARY EMBODIMENTS

With reference to the drawings non-limiting illustrative embodiments will now be described.

In accordance with an aspect of the present invention, "object types" may include sticky notes, pages, groups, images, easels etc., whereas "containers" may be characterized as a window, a header, a group, a directory, and the like. In accordance with an embodiment of the present invention, groups of objects may also represent a container, therefore containers may also include images, groups, pages, and easels. Furthermore, containers may include a data storage structure, such as a window hidden from the user. In other words, containers may be displayed as a cluster of objects in close proximity to each other. Furthermore, a system may use vertical layers to communicate a hierarchical structure of the system and is described hereinafter.

Figure 1:
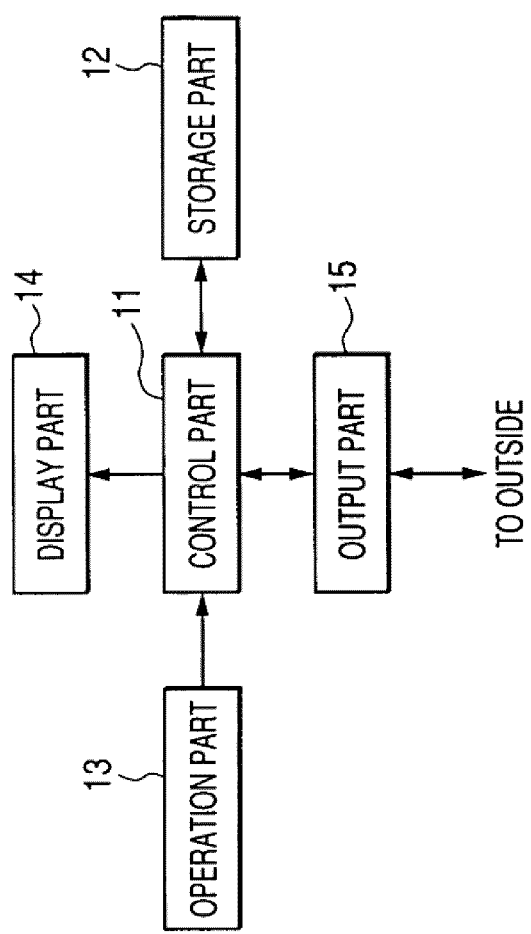
FIG. 1 is a functional block diagram of a computer system according to related art.
Figure 2:
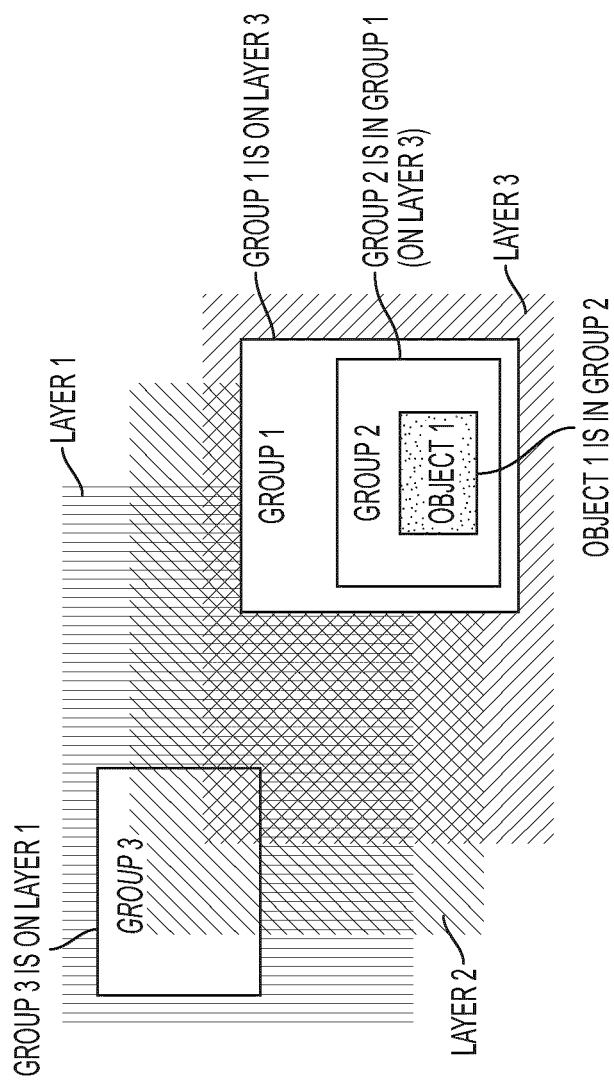
FIG. 2 is a perspective view of a system having a display structured using layering according to an embodiment of the present invention.

With reference to FIG. 2, since layers are used to create a vertical hierarchy within the system, objects may be placed on a layer for improved presentation. Sorting of the objects residing on the layers may be sorted using parameters such as the object type, size of the object, and the locking status of the layer for automation. For example, the system may sort objects into the layers such as the following but are not limited to:

Layer 0 (Top Layer): Notes unless they are dropped into a container,
Layer 1: Smaller groups and images;
Layer 2: Larger groups and images;
Layer 3: Easels;
Layer 4: Templates;
Layer 5 (Bottom Layer): Background Since objects may be grouped with containers, they may be removed from a present layer and placed into a container, where the object would change the layer to that of the container, regardless of the location of the layer in the hierarchy. Furthermore, as objects may be removed from a container, they may be moved back to their respective previous layers in the hierarchical structure of the system, which may be defined according to the layer list above.

As shown in FIG. 2, Object 1 is contained in Group 2 wherein Group 2 is contained in Group 1. Since Group 1 is a member of Layer 1, each object of Group 1, including Group 2, is on Layer 1. Furthermore, it can be said that each Object in Group 1 moves together as one entity. For example, if a user clicks on Object 1 and drags Object 1 out of Group 2 into Group 1, then Group 1 and Object 1 move together. Alternatively, if Group 3 is dragged into Group 1, then Group 1 will consist of Group 2, Group 3 and Object 1 according to the present invention.

Objects may be automatically separated into layers according to the present invention. Separation of layers may be based off of the object type, allowing for seamless clumping of objects when groups of objects are created of either the same type or of different types across layers. Additionally, each container maintains the same hierarchical structure of layers within the container, so that when an object is placed into a container it can be placed into its layer within the group (e.g., notes over images, and so on).

Figure 3A:
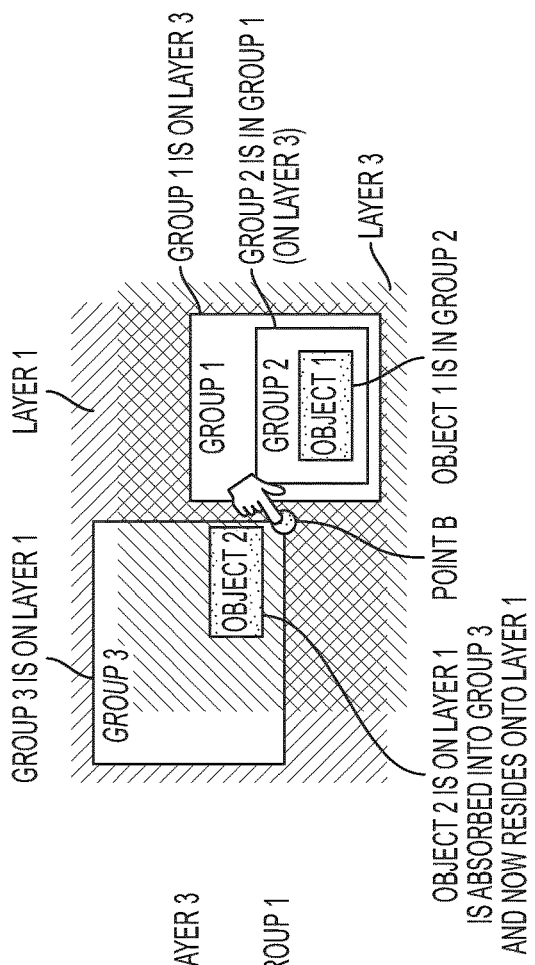
FIGS. 3A, 3B and 3C illustrate a method of grouping an object by resizing and enveloping a container according to an exemplary embodiment of the invention.
Figure 3B:
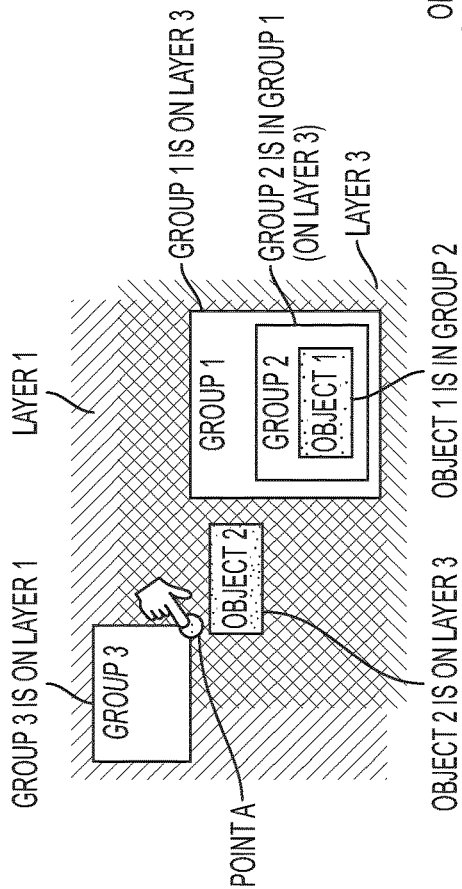
Figure 3C:
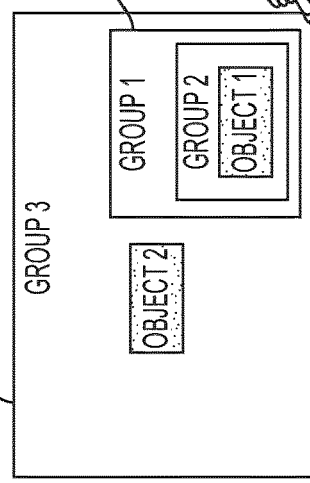

Resizing the group to include objects preferred by the user may be used to group and contain the preferred objects. With reference to FIGS. 3A and 3B, the user has resized Group 3 from Point A to Point B (by dragging) to include Object 2 into Group 3. Note that Object 2 became a member of Layer 1 rather than Layer 3 because the resizing of the group caused the object to be absorbed to the layer the group resides in. Thus, the object may move layers. In FIG. 3C, further resizing of the group to Point C caused Group 1 and all its' contents (Group 2 and Object 1) to be placed into Group 3. Also note that as objects are absorbed into a group the visual presentation (for example, border color illustrated by the gray border in FIG. 3C and removal of a shadow) is changed to show the changes to the user as they happen.

Figure 3D:
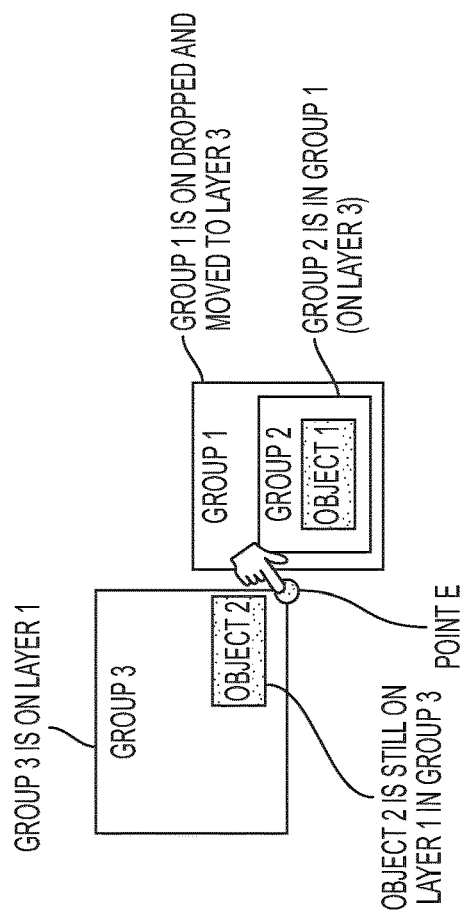
FIGS. 3D, 3E and 3F illustrate a method of ungrouping an object by resizing a container and dropping the object according to an exemplary embodiment of the invention.
Figure 3E:
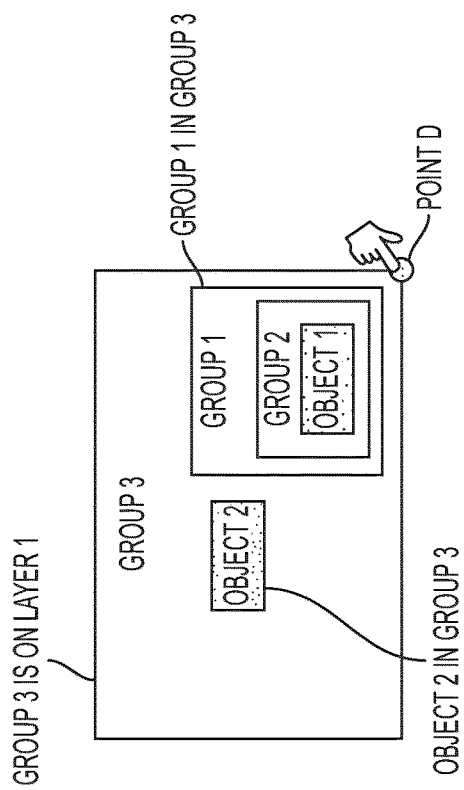
Figure 3F:
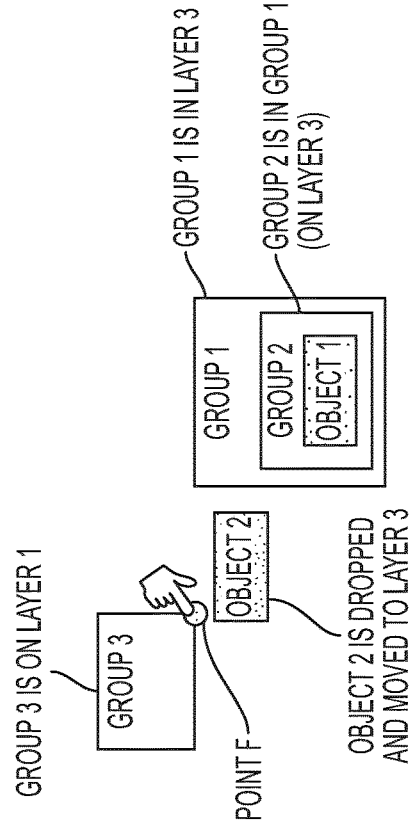

FIGS. 3D, 3E and 3F demonstrate how ungrouping may be performed by resizing the container to exclude Object 2 and Group 1 from Group 3 by resizing the container accordingly, and wherein the size of the container, defined by the user, no longer contains the objects. Note that as objects are dropped they return to their original layers and that the visual presentation (black border color and addition of a shadow) is changed to show the changes to the user as they happen.

An alternative method of grouping and ungrouping objects is by dragging and dropping objects into and out of a container. As shown in FIGS. 4A and 4B, grouping may be performed by dragging and dropping Object 1 into Group 3. Note that Object 1 is now a member of the layer Group 3 is a part of, a.k.a. Layer 1 because Group 3 is a part of Layer 1. Ungrouping Object 1 from Group 3 may be performed by dragging and dropping Object 1 out from Group 3. Again, the object(s) may move among layers.

Many conventional systems use dragging and dropping to perform operations such as grouping and ungrouping of objects. However, the use of layers and the application of hit testing and fit testing (to be described below) allow for a seamless, automated experience for the user, and more efficiency in processing the operative steps in the system.

Hit and Fit testing allows for the determination of where and how objects are identified and located in the system. Hit testing determines if a touch or mouse down event occurred on an object making it the manipulated item for the touch or mouse manipulation. Hit testing is done by testing the mouse down or touch down events location to determine the object to be manipulated in the system in regards to position, layers and container encapsulation. Fit testing determines where the identified object lands in the system in regards to position, layers and container encapsulation. Fit testing is done when either an object or container is being manipulated and determines which container an object would be dropped into at the end of a manipulation.

Figure 5A:
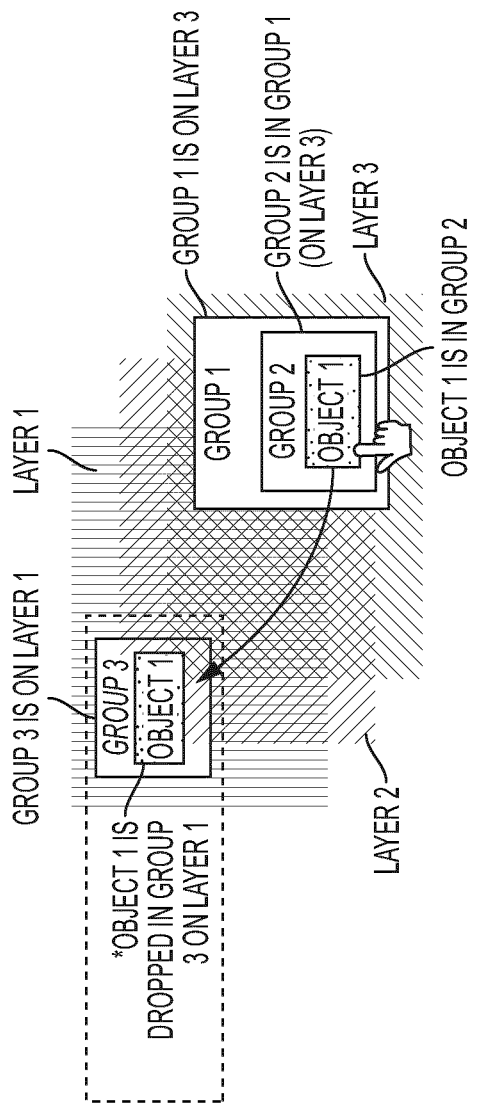
FIGS. 5A and 5B describe and illustrate the use of fit testing in a system having layers and the method of hit testing within the layers of a system respectively.

For example, as shown in FIG. 5A, Object 1 is a member of Group 3 where Group 3 is on Layer 1 as determined by hit testing, and since Object 1 has a high percentage of its area contained on Group 3, fit testing determines Object 1 inherently becomes a member of Group 3. Hit testing and Fit testing may use a similar algorithm for operating through each group on a vertical layer in the hierarchy of the system. Fit testing may be used to test if a single location is within the bounds of an object or container and may be used to see the percentage of area of an object that is encapsulated by a container (Note: fit testing may be used for fitting objects into containers rather than fitting objects that are not containers). Furthermore, each layer may be searched through using hit testing when a user clicks on an object, wherein hit test is further described below with respect to FIG. 5B.

Figure 5B:
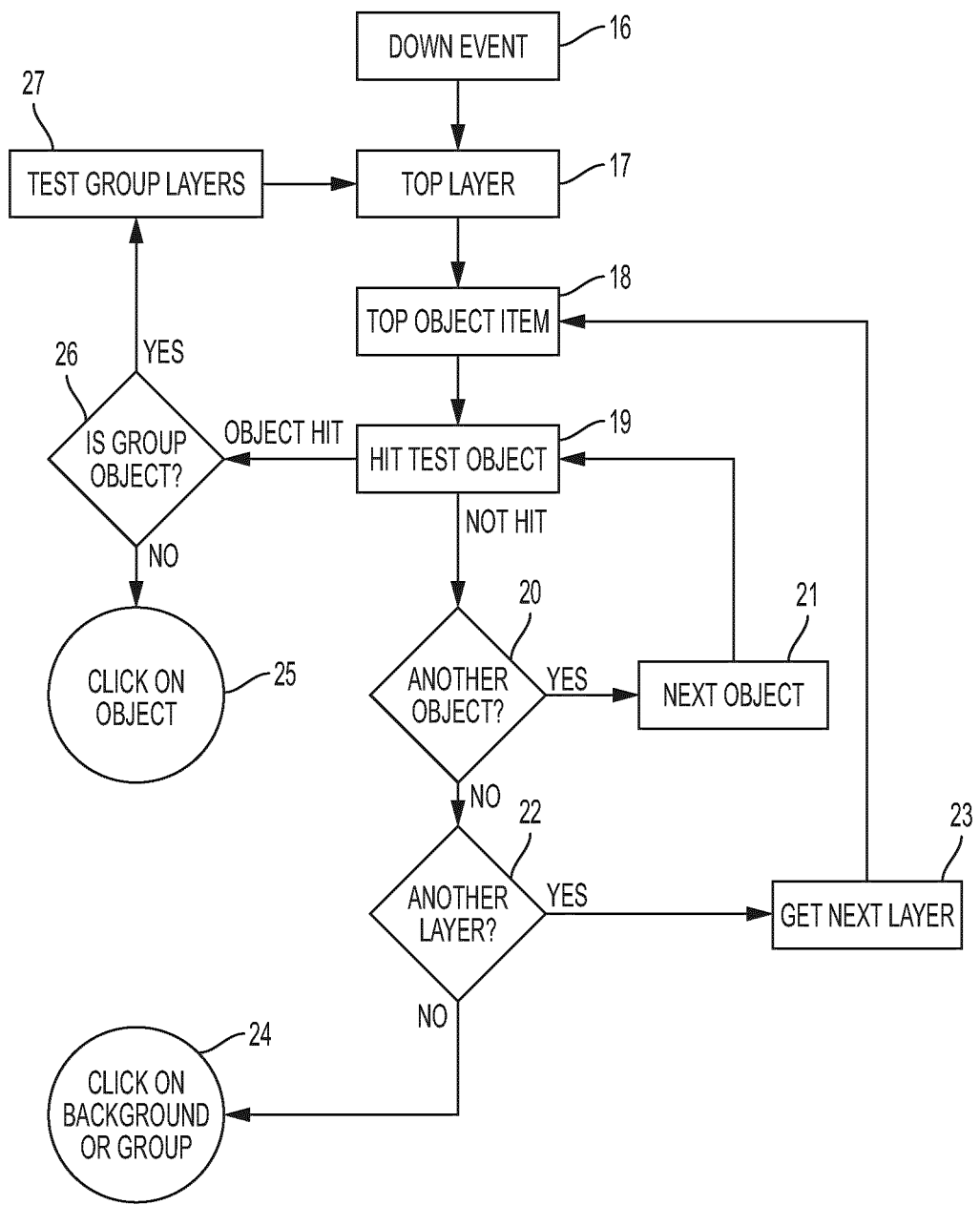

As shown in FIG. 5B, the method of hit testing is described using events, wherein events are processed by the system described in FIG. 2. Starting with a Touch or Mouse Down Event (16), the hit test starts testing a top layer of the canvas (or workspace) (17), more specifically on a Top Object of the top layer (18). The object is "Hit Tested" (19) to determine if the object has been hit. If the object has not been hit, the algorithm finds the next object in the layer (20 & 21) and repeats hit testing (18). However, if the algorithm has tested each object of each layer (24) the algorithm determines that the user had clicked on the background. Once the hit test is successful on an object instead of a group (19), then the algorithm determines that the user had clicked on an object (25). However, if the hit test is successful on a group (26), then the algorithm hit tests the objects contained in the group that the hit test was successful on (27). Groups containing objects are stored on the same hierarchy in the system and therefore have the same layering, grouping, and vertical sorting used by a canvas (workspace). Furthermore, the same algorithm may be recursively employed to test a group, until the object is found (25). In addition, if the algorithm has "hit tested" each layer, the last group successfully hit tested (26), may be reported as the "hit" object. Hit testing may be performed on objects within a container or a group since according to the present invention, groups within groups (a.k.a. nested groups) are clickable. Inherently shown as an object, nested groups use recursive "hit testing" to determine which object the user has clicked on. The method of recursive hit testing allows the user to seamlessly hit and drag or drop a successfully "hit" object, wherein the object may be in a random position within a nested group and a vertical layer.

Figure 6A:
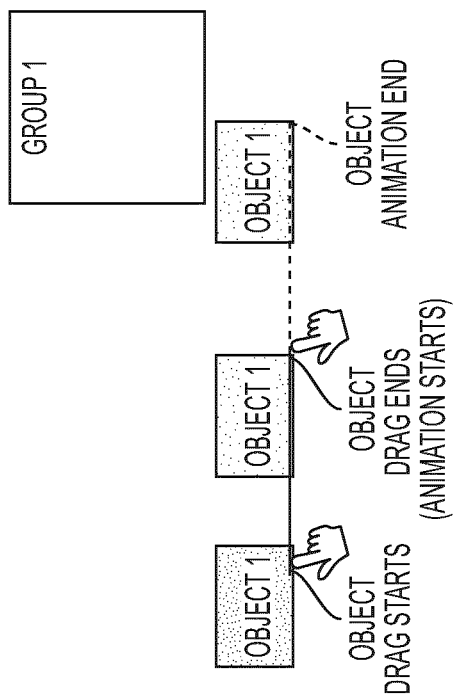
FIGS. 6A and 6B illustrate the use of animation to group objects and the improved use of animation using gravitational pull to group objects according to an exemplary embodiment of the invention.
Figure 6B:
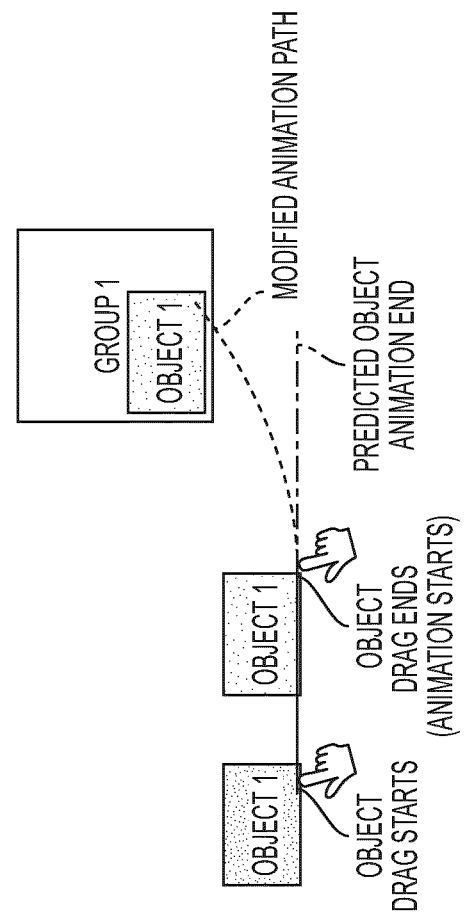

Another aspect of the present invention is automatic grouping based on an object's location, i.e. proximity to a group. Animation may be used when a user throws or moves (or "flicks") an object with preferred speed and direction with the intention of grouping the object according to the user preferences. Note that according to the present invention, when objects are within close proximity to other objects they may be combined into a group. FIGS. 6A and 6B illustrate the use of animation to group notes in in present system.

Furthermore, when the user "throws" the object, groups on the system may use gravitational pull to pull the object into the group as the object approaches a pre-defined vicinity of a group within the system. As shown in FIGS. 6A and 6B, the end point of where an object may land on a display of a system after an animation may be predicted. According to the present invention, "gravity" may be used to pull the thrown object into a group as it approaches within a pre-defined vicinity of a group within the system. FIG. 6B illustrates the gravitational feature as a "modified animation path" for Object 1. Determining whether "gravity" will affect a thrown object is determined by the thrown object's expected finishing location and a configurable parameter for distance from the target. If the finishing location is within the determined distance from the target object or is on the object, the path of the animation of the thrown object may be changed ("gravity") to finish to a predetermined position within the target. If more than one target is deemed viable, then the target that is closest to the expected finishing location of the thrown object will be selected. If no target is suitable, then the thrown object runs its animation to the expected finishing location. For a suitable target, the finishing location is determined by the grid/layout algorithm of the target object. The animation of the throw object is bent to mimic the gravitational pull of the target's finishing location.

Additional features such as visual cues, less commands, and group actions may be used to improve a user's experience of the system and the efficiency of processing user requirements on the system. The additional features allow for seamless operation of the grouping and ungrouping of objects and are described hereinafter.

For example, visual cues such as highlighting and shadowing provide an indication as to what objects are held in a group or container. Visual cues may be used when an object is dragged over a group, to indicate that dropping the object would result in combining the object with the group "cued" and to provide an improvement to user experience. Furthermore, the use of fewer commands, such as mouse clicks and menu drop down or decision text boxes, may provide a more efficient method of grouping and ungrouping within the system. Improved efficiency provides for faster processing and indirectly an improved user experience. For example, conventional systems use an edit mode to group objects, however the extra command is insignificant in the present invention, wherein less commands provide for fewer processing commands within the system and speeding the processing of user requirements. Additionally, group actions may be used to perform actions on each item contained in a group such as sorting. Actions performed on a group may include dynamic changes to the group entity such as changes to the viewing attributes such as colors, deleting, duplicating, hiding, resizing etc. wherein performing actions on each item in a group may further enhance the experience for a user.

An alternative method of grouping objects may use selection on the object and proximity to other selected objects. A virtual group would be created by objects that were selected near to each other. Furthermore, any actions that the user applies to one object would also be applied to the other objects in the virtual group. For example, when items are selected in proximity to each other, the action of dragging any of the objects would also be applied to the other items in the virtual group. Similar group like functionality would also be transferred to all the items in the virtual group.

The methods described herein are non-limiting illustrative embodiments that may work with modifications and alternative embodiments that were not described within this application but may easily be understood by a person of ordinary skill in the art. An application and use of the present invention may provide for a faster method of managing and organizing objects within a computer system.

Embodiments include a method for organizing and automatically assigning objects and containers of a virtual workspace between layers. The method includes displaying, on a display apparatus, a plurality of objects and containers on the virtual workspace, said plurality of objects and containers being assigned to corresponding different ones of a plurality of hierarchical layers, receiving user input, via a user interface apparatus, for moving an object or container in relation to one or more of the plurality of objects and containers changing the corresponding layer of one or more of the plurality of objects and containers, automatically assigning the corresponding layer of one or more of the plurality of objects and containers by recursively fit testing each of the plurality of layers for an overlap between the one or more of the plurality of objects and containers and each container assigned to each layer based on the user input, incorporating the one or more of the plurality of objects and containers into a target container assigned to a target layer when the overlap exceeds a predetermined threshold, and, assigning the one or more of the plurality of objects and containers to a background layer when the overlap fails to exceed the predetermined threshold in the fit testing.

Embodiments include a program embodied in a non-transitory computer readable medium for organizing and automatically assigning objects and containers of a virtual workspace between layers, said program including instructions for at least one processor to perform the following method. The method includes displaying, on a display apparatus, a plurality of objects and containers on the virtual workspace, said plurality of objects and containers being assigned to corresponding different ones of a plurality of hierarchical layers, receiving user input, via a user interface apparatus, for moving an object or container in relation to one or more of the plurality of objects and containers changing the corresponding layer of one or more of the plurality of objects and containers, automatically assigning the corresponding layer of one or more of the plurality of objects and containers by recursively fit testing each of the plurality of layers for an overlap between the one or more of the plurality of objects and containers and each container assigned to each layer based on the user input, incorporating the one or more of the plurality of objects and containers into a target container assigned to a target layer when the overlap exceeds a predetermined threshold, and, assigning the one or more of the plurality of objects and containers to a background layer when the overlap fails to exceed the predetermined threshold in the fit testing.

Embodiments further include a system for organizing and automatically assigning objects and containers of a virtual workspace between layers. The system includes a display apparatus, a user interface apparatus, memory, and one or more processors configured to execute one or more programs stored on the memory, said one or more programs including instructions for displaying, on the display apparatus, a plurality of objects and containers on the virtual workspace, said plurality of objects and containers being assigned to corresponding different ones of a plurality of hierarchical layers, receiving user input, via the user interface apparatus, for moving an object or container in relation to one or more of the plurality of objects and containers, automatically assigning the corresponding layer of one or more of the plurality of objects and containers by recursively fit testing each of the plurality of layers for an overlap between the one or more of the plurality of objects and containers and each container assigned to each layer based on the user input, incorporating the one or more of the plurality of objects and containers into a target container assigned to a target layer when the overlap exceeds a predetermined threshold, and, assigning the one or more of the plurality of objects and containers to a background layer when the overlap fails to exceed the predetermined threshold in the fit testing.

What is claimed is:

1. A method for organizing and automatically assigning objects and containers of a virtual workspace between layers, the method comprising:
   displaying, on a display apparatus, a plurality of objects and containers on the virtual workspace, said plurality of objects and containers being assigned to corresponding different ones of a plurality of hierarchical layers;
   receiving user input, via a user interface apparatus, for moving an object or container in relation to one or more of the plurality of objects and containers;
   automatically assigning the corresponding layer of one or more of the plurality of objects and containers by recursively testing each of the plurality of layers for an overlap between the one or more of the plurality of objects and containers and each container assigned to each layer based on the user input, wherein the recursively testing determines a position, layer, and container on which an object lands and includes a plurality of steps for each of the plurality of layers, the steps starting with a top layer of the plurality of layers and including:
   (i) determining if a test object in a layer of the plurality of layers has been hit;
   (ii) if the test object in the layer has not been hit, determining if there is a next object in the layer;
   (iii) if there is a next object in the layer, repeating (i)-(ii) with the next object as the test object;
   (iv) if there is not a next object in the layer, repeating (i)-(ii) with a next layer in the plurality of layers until there are no more layers in the plurality of layers;
   (v) if the test object in the layer has been hit, determining if test object is within a container; and
   (vi) if the test object is not within the container, determine that the user clicked on the test object,
   incorporating, based on the recursively testing steps, the one or more of the plurality of objects and containers into a target container assigned to a target layer when the overlap exceeds a predetermined threshold; and
   assigning the one or more of the plurality of objects and containers to a background layer when the overlap fails to exceed the predetermined threshold in the fit testing.

2. The method of claim 1, wherein the one or more of the plurality of objects and containers retain respective hierarchical attributes in relation to the target container.

3. The method of claim 1, wherein the user input comprises one or more of:
   moving the one or more of the plurality of objects and containers; and
   resizing one of the containers to envelope or exclude the one or more of the plurality of objects and containers.

4. The method of claim 3, further comprising:
   recursively testing each of the plurality of layers to identify, for the moving, the one or more of the plurality of objects and containers and, for the resizing, the one of the containers based on a starting position of the user input.

5. The method of claim 3, wherein the recursively testing is based on an end position of the user input, the end position defining, for the moving, a finishing location of the one or more of the plurality of objects and containers and, for the resizing, a target size of the one of the containers.

6. The method of claim 5, wherein, for the moving, the finishing location of the one or more of the plurality of objects and containers is further determined based on a velocity and direction of the user input.

7. The method of claim 6, wherein the finishing location of the one or more of the plurality of objects and containers is further determined based on a vicinity parameter for asserting a gravity towards one or more target objects or containers.

8. The method of claim 1, wherein the recursively testing comprises recursively fitting the one or more of the plurality of objects and containers within each level of a nested container to identify a target level within a hierarchy of the nested container.

9. The method of claim 1, wherein visual cues are provided to indicate object status and available actions in relation to the one or more of the plurality of objects and containers.

10. The method of claim 1, wherein the received input is across a plurality of concurrent users, via a shared user interface apparatus.

11. The method of claim 1, wherein the received input is across a plurality of concurrent users, via a plurality of user interface apparatuses (i) which are collocated in the same room and (ii) remotely located not in the same room.

12. A program embodied in a non-transitory computer readable medium for organizing and automatically assigning objects and containers of a virtual workspace between layers, said program comprising instructions for at least one processor to perform:
   displaying, on a display apparatus, a plurality of objects and containers on the virtual workspace, said plurality of objects and containers being assigned to corresponding different ones of a plurality of hierarchical layers;
   receiving user input, via a user interface apparatus, for moving an object or container in relation to one or more of the plurality of objects and containers;
   automatically assigning the corresponding layer of one or more of the plurality of objects and containers by recursively testing each of the plurality of layers for an overlap between the one or more of the plurality of objects and containers and each container assigned to each layer based on the user input, wherein the recursively testing determines a position, layer, and container on which an object lands and includes a plurality of steps for each of the plurality of layers, the steps starting with a top layer of the plurality of layers and including:
- (i) determining if a test object in a layer of the plurality of layers has been hit;
- (ii) if the test object in the layer has not been hit, determining if there is a next object in the layer;
- (iii) if there is a next object in the layer, repeating (i)-(ii) with the next object as the test object;
- (iv) if there is not a next object in the layer, repeating (i)-(ii) with a next layer in the plurality of layers until there are no more layers in the plurality of layers;
- (v) if the test object in the layer has been hit, determining if test object is within a container; and
- (vi) if the test object is not within the container, determine that the user clicked on the test object, incorporating, based on the recursively testing steps, the one or more of the plurality of objects and containers into a target container assigned to a target layer when the overlap exceeds a predetermined threshold; and assigning the one or more of the plurality of objects and containers to a background layer when the overlap fails to exceed the predetermined threshold in the recursively testing.

13. The program of claim 12, wherein the one or more of the plurality of objects and containers retain respective hierarchical attributes in relation to the target container.

14. The program of claim 12, wherein the user input comprises one or more of:
- (i) moving the one or more of the plurality of objects and containers; and
- (ii) resizing one of the containers to envelope or exclude the one or more of the plurality of objects and containers.

15. The program of claim 14 further comprising instructions to perform:
recursively testing each of the plurality of layers to identify, for the moving, the one or more of the plurality of objects and containers and, for the resizing, the one of the containers based on a starting position of the user input.

16. The program of claim 14, wherein the recursively testing is based on an end position of the user input, the end position defining, for the moving, a finishing location of the one or more of the plurality of objects and containers and, for the resizing, a target size of the one of the containers.

17. The program of claim 16, wherein, for the moving, the finishing location of the one or more of the plurality of objects and containers is further determined based on a velocity and direction of the user input.

18. The program of claim 17, wherein the finishing location of the one or more of the plurality of objects and containers is further determined based on a vicinity parameter for asserting a gravity towards one or more target objects or containers.

19. The program of claim 12, wherein the recursively testing comprises recursively fitting the one or more of the plurality of objects and containers within each level of a nested container to identify a target level within a hierarchy of the nested container.

20. The program of claim 12, wherein visual cues are provided to indicate object status and available actions in relation to the one or more of the plurality of objects and containers.

21. A system for organizing and automatically assigning objects and containers of a virtual workspace between layers, comprising:
- a display apparatus;
- a user interface apparatus;
- memory; and
- one or more processors configured to execute one or more programs stored on the memory, said one or more programs comprising instructions for:
  - displaying, on the display apparatus, a plurality of objects and containers on the virtual workspace, said plurality of objects and containers being assigned to corresponding different ones of a plurality of hierarchical layers;
  - receiving user input, via the user interface apparatus, for moving an object or container in relation to one or more of the plurality of objects and containers;
  - automatically assigning the corresponding layer of one or more of the plurality of objects and containers by recursively fit testing each of the plurality of layers for an overlap between the one or more of the plurality of objects and containers and each container assigned to each layer based on the user input, wherein the recursively testing determines a position, layer, and container on which an object lands and includes a plurality of steps for each of the plurality of layers, the steps starting with a top layer of the plurality of layers and including:
    - (i) determining if a test object in a layer of the plurality of layers has been hit;
    - (ii) if the test object in the layer has not been hit, determining if there is a next object in the layer;
    - (iii) if there is a next object in the layer, repeating (i)-(ii) with the next object as the test object;
    - (iv) if there is not a next object in the layer, repeating (i)-(ii) with a next layer in the plurality of layers until there are no more layers in the plurality of layers;
    - (v) if the test object in the layer has been hit, determining if test object is within a container; and
    - (vi) if the test object is not within the container, determine that the user clicked on the test object,
  - incorporating, based on the recursively testing steps, the one or more of the plurality of objects and containers into a target container assigned to a target layer when the overlap exceeds a predetermined threshold; and
  - assigning the one or more of the plurality of objects and containers to a background layer when the overlap fails to exceed the predetermined threshold in the recursively testing.

22. The system of claim 21, wherein the one or more of the plurality of objects and containers retain respective hierarchical attributes in relation to the target container.

23. The system of claim 21, wherein the user input comprises one or more of:
- (i) moving the one or more of the plurality of objects and containers; and
- (ii) resizing one of the containers to envelope or exclude the one or more of the plurality of objects and containers.

24. The system of claim 23, wherein said one or more programs further comprises instructions for:
recursively testing each of the plurality of layers to identify, for the moving, the one or more of the plurality of objects and containers and, for the resizing, the one of the containers based on a starting position of the user input.

25. The system of claim 23, wherein the recursively testing is based on an end position of the user input, the end position defining, for the moving, a finishing location of the one or more of the plurality of objects and containers and, for the resizing, a target size of the one of the containers.

26. The system of claim 25, wherein, for the moving, the finishing location of the one or more of the plurality of objects and containers is further determined based on a velocity and direction of the user input.

27. The system of claim 26, wherein the finishing location of the one or more of the plurality of objects and containers is further determined based on a vicinity parameter for asserting a gravity towards one or more target objects or containers.

28. The system of claim 21, wherein the recursively testing comprises recursively fitting the one or more of the plurality of objects and containers within each level of a nested container to identify a target level within a hierarchy of the nested container.

29. The system of claim 21, wherein visual cues are provided to indicate object status and available actions in relation to the one or more of the plurality of objects and containers.

* * * * *

UNITED STATES PATENT AND TRADEMARK OFFICE
CERTIFICATE OF CORRECTION

PATENT NO. : 11,262,897 B2
APPLICATION NO. : 15/580391
DATED : March 1, 2022
INVENTOR(S) : Doug Hill, Mark Andrew Fletcher and Stacey Ellen Black It is certified that error appears in the above-identified patent and that said Letters Patent is hereby corrected as shown below:

On the Title Page

Page 2, Column 1, Line 2, "assigns" should be --assign--;

In the Claims

Column 8, Line 3, "fit" should be deleted;

Column 10, Line 21, "fit" should be deleted;

Column 10, Line 42, "determine" should be --determining--.

Signed and Sealed this
Thirtieth Day of August, 2022

Katherine Kelly Vidal
*Director of the United States Patent and Trademark Office*